United States Patent [19]
Treuer

[11] 3,863,462
[45] Feb. 4, 1975

[54] FLAKE ICE PRODUCING MACHINE

[76] Inventor: Allan J. Treuer, 2241 40th St. E., Seattle, Wash.

[22] Filed: June 29, 1973

[21] Appl. No.: 375,059

[52] U.S. Cl. ................................. 62/345, 62/354
[51] Int. Cl. ............................................. F25c 7/12
[58] Field of Search ................ 62/354, 345; 165/91

[56] References Cited
UNITED STATES PATENTS

| | | | |
|---|---|---|---|
| 171,267 | 12/1875 | Cook | 62/345 |
| 518,618 | 4/1894 | Mendes | 165/91 |
| 2,054,841 | 9/1936 | Taylor | 62/354 |
| 3,159,986 | 12/1964 | King | 62/354 |

FOREIGN PATENTS OR APPLICATIONS

| | | | |
|---|---|---|---|
| 408,032 | 10/1909 | France | 165/91 |

*Primary Examiner*—Meyer Perlin

[57] ABSTRACT

This invention relates to flake ice producing machines of sizes rated in production of tons of ice per 24-hour day. The machine has one or more upright round discs rotating on a horizontal shaft. The outer surfaces of the disc are flat and are the surfaces upon which the ice is formed. Water or other congealable liquid is flowed upon the surface and frozen into a sheet of ice from which it is removed in flakes. Coolant is pumped through the shaft and into and out of the disc interior for removing heat. The flake ice is collected by gravity flow below the area of removal.

9 Claims, 6 Drawing Figures

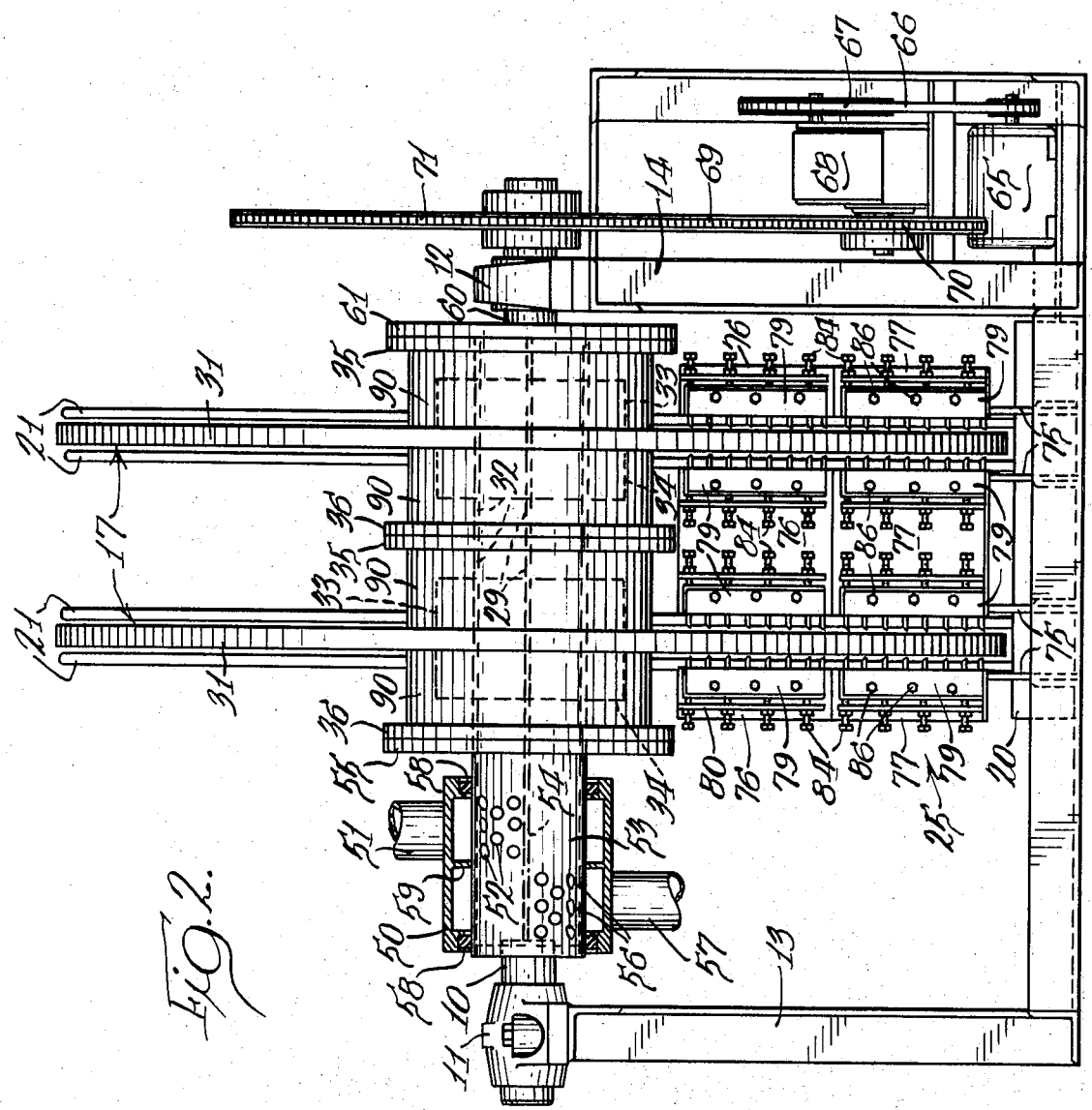

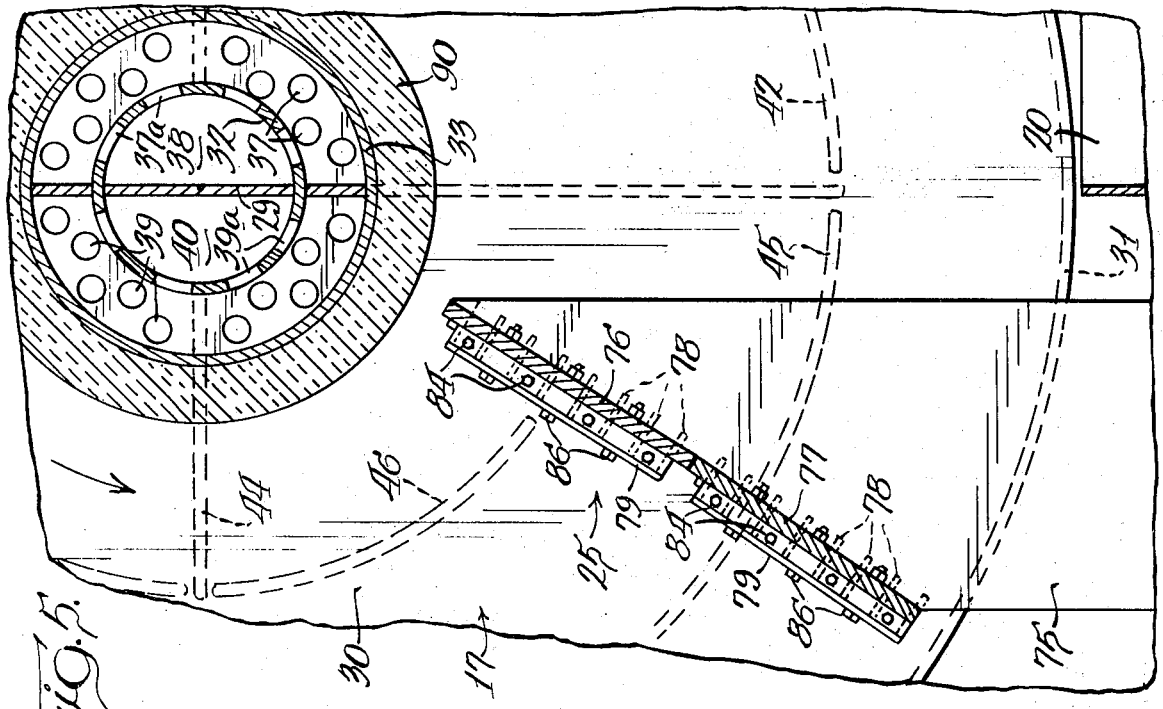
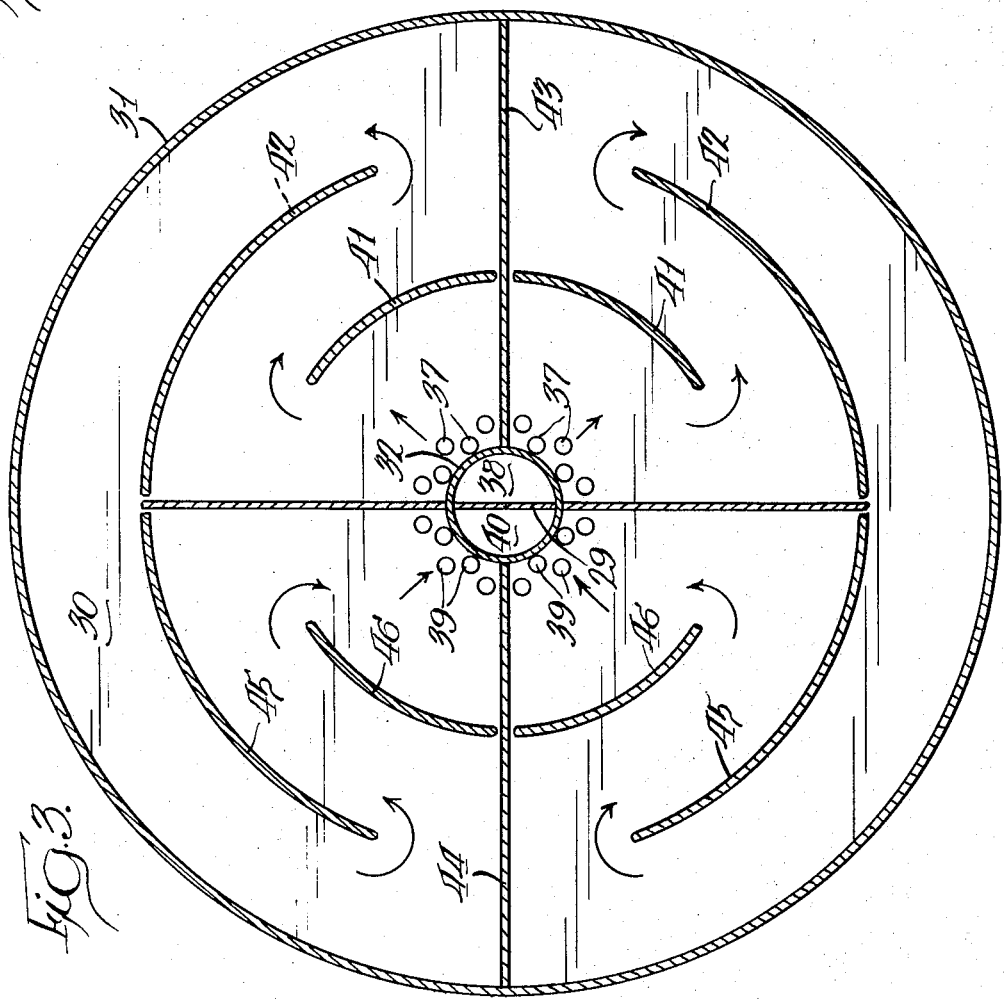

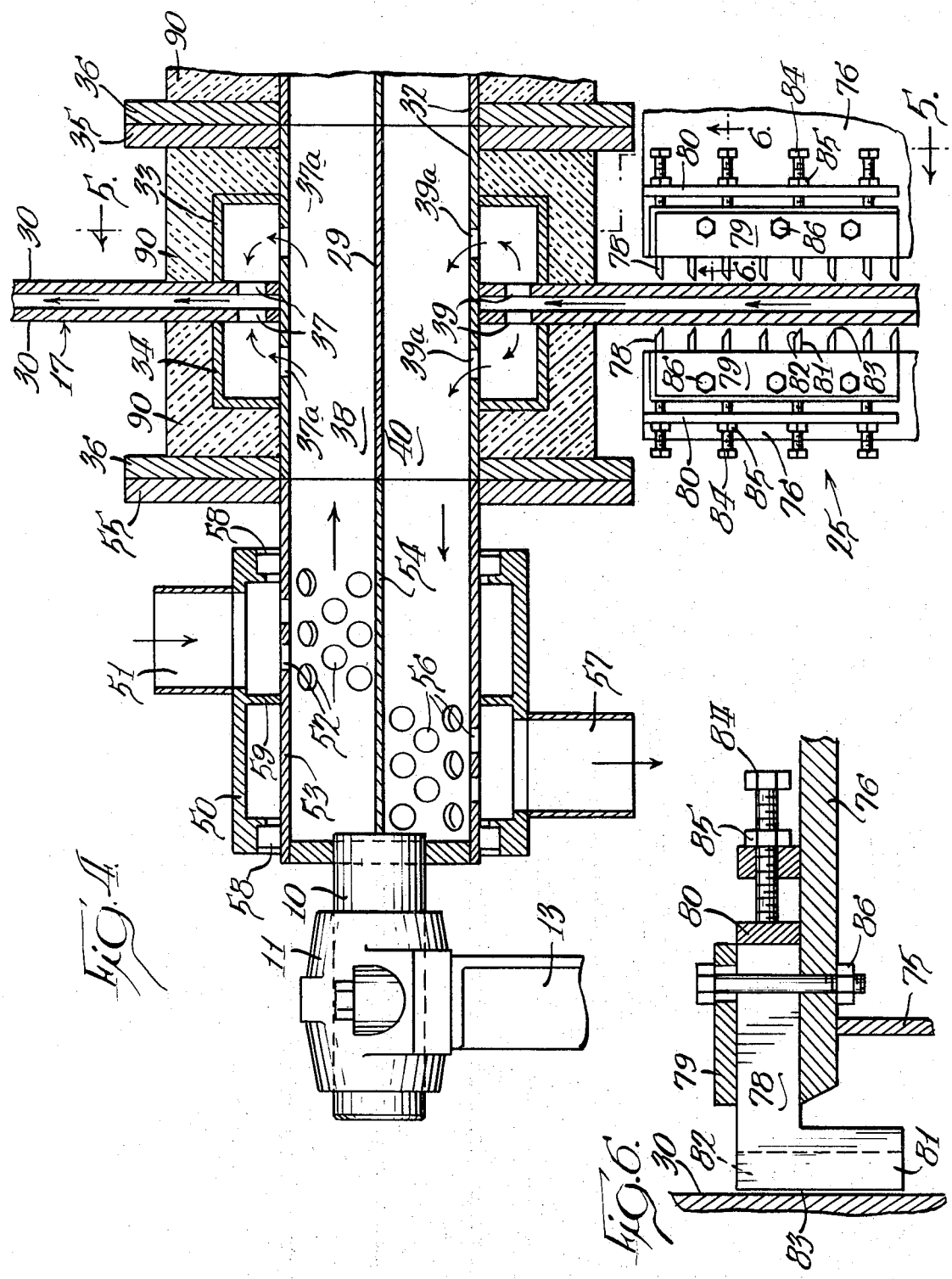

FLAKE ICE PRODUCING MACHINE

BACKGROUND OF THE INVENTION

Flake ice is utilized in the food processing industry, in chemical and dye manufacturing, in construction for cooling massive deposits of concrete, and other industries in large quantities. The ice is like coins in size although irregular in outer peripheral shape. Ice that is super-cooled to around 0°F is dry and capable of being conveyed by mechanical means or blown through pipes with air pressure for handling purposes. The ice may be stored for long lengths of time in large insulated and refrigerated storage bins without congealing together.

In the past, the most successful ice making machinery capable of producing up to 30 tons of ice per 24-hour day has been an upright cylindrical bodied machine in which the ice sheet was formed on the interior of the cylinder and removed by ice removal tools rotating about the interior. For many years, the most notable machine of this type has been manufactured and sold throughout the world and is substantially in accordance with U.S. Pat. No. 2,735,275. Earlier attempts at making ice machines have not been so successful, but are generally illustrated in patents, such as 2,308,541, 2,431,278, 2,310,468 and 2,585,020.

In the fishing industry, dockside ice making facilities generally store many tons of flake ice for filling holds of fishing vessels heading from port to the fishing area. The ice is used to preserve the fish caught until the boat may return to a cannery.

In poultry and other food processing operations, large quantities of ice are used to mix with water for chilling purposes and for various processes where the eventual food production may be frozen.

SUMMARY OF THE INVENTION

The present invention provides a new and heretofore unknown construction of a large capacity flake ice producing machine. In general, ice making surfaces are provided as the outer surfaces of a large flat faced disc so mounted that the surfaces may rotate continuously in an upright plane on a horizontal shaft. The congealable liquid is flowed upon approximately one-half of the flat disc surface, that is to one side of an imaginary upright division of the disc. The liquid is supplied in excess so that the disc being cooled from the interior will freeze the liquid into a sheet of ice about one tenth inch thick. The disc, being constantly rotated, carries the ice through a clock-like motion through a cooling zone and then against ice removal tools which remove the ice from the surface allowing it to fall into a receptacle below the machine. The surface from which the ice was removed, proceeding into the liquid application zone to receive more liquid to be congealed. The only moving part of the machine is the disc.

It is the principal object of this invention to make a new and improved flake ice production machine having a large capacity at lower cost of a machine than heretofore known.

It is a further object of this invention to make a compact machine reliable in operation for continuous 24-hour per day, day after day, production of flake ice, requiring shutdown only for periodic maintenance of the refrigerant system.

The present ice making machine is subjected to very little wear of its parts in operation, the only wear being the abrasion of the ice against the removal tools, and replacement of such tools are made simple due to the construction of the machine.

It is a further object of this invention to facilitate construction of larger capacity machines by the duplication of the discs comprising the ice producing surfaces; a doubling of the number of disc resulting in doubled capacity production.

DESCRIPTION OF THE DRAWINGS

FIG. 2 is an upright elevational view of the machine at 90° to the view of FIG. 1;

FIG. 3 is a plan view of a portion of the disc showing the internal construction thereof;

FIG. 4 is a broken, elevational sectional view through one disc and adjacent machine parts;

FIG. 5 is a fragmentary enlarged view of one disc and ice removal mechanism employed in the machine taken substantially along line 5—5 in FIG. 4; and FIG. 6 is a partial section and partially elevational view of the ice tool mounting mechanism illustrated in FIG. 5.

DESCRIPTION OF THE PREFERRED EMBODIMENT

Figure 1:
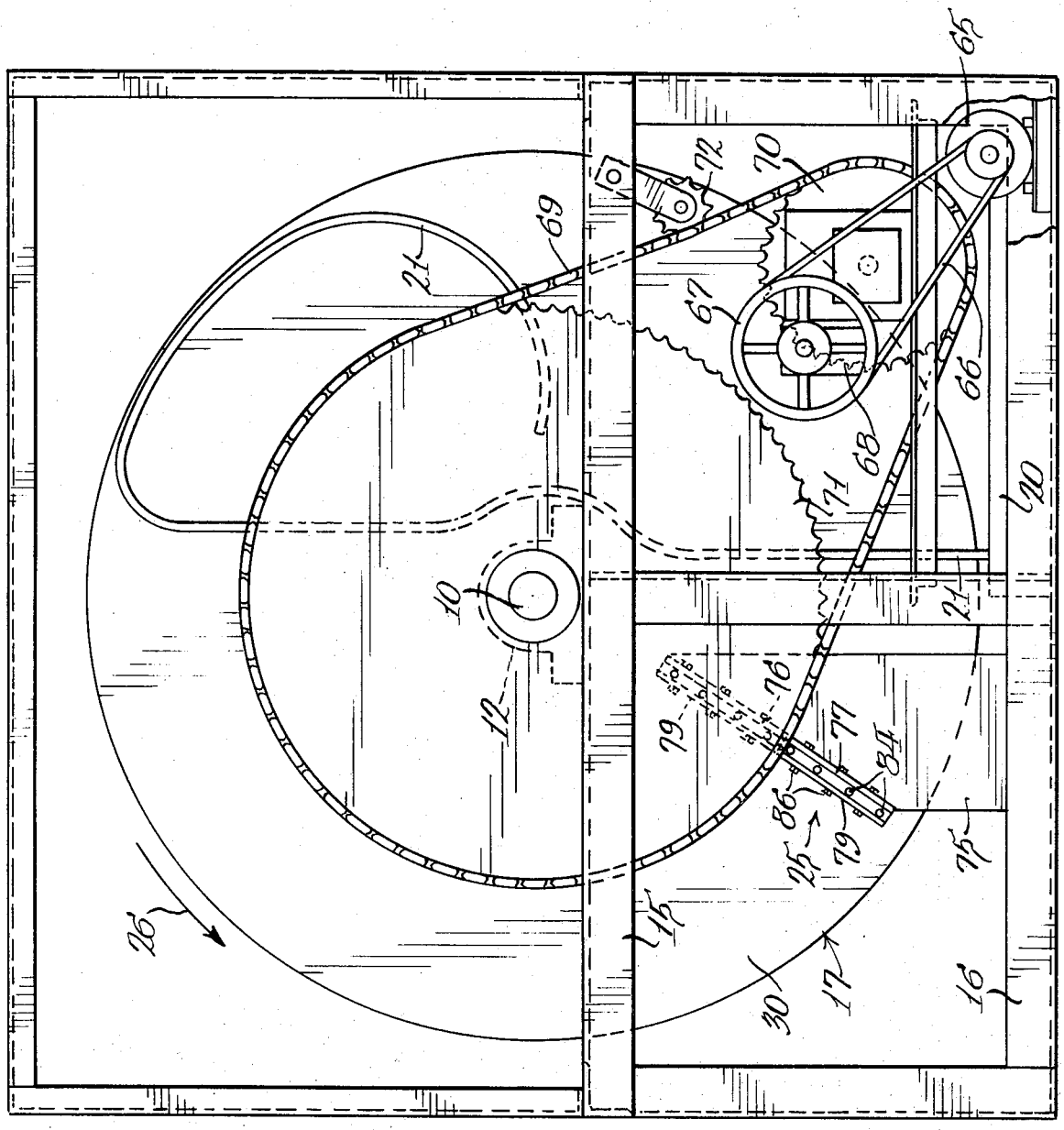
FIG. 1 is an elevational view of the machine looking toward the horizontal shaft with portions broken away for clarity of illustration.

A most usual installation in which the present machine would be utilized may have the ice making machine mounted above a refrigerated room to receive the flake ice and store flake ice in volume of the order to 20 to 600 tons at a time. The interior of the ice making machine will be at least 15°F below the temperature of the ice removed and at a lower temperature than the storage room which will be near 0°F if dry flakes of ice are desired. The machine produces ice continuously night and day, running unattended. Little maintenance is required and that is generally directed to removing oil from the refrigerant system and checking upon the proper positioning of the ice removal tools. Referring to FIGS. 1 and 2, the machine has a horizontal shaft 10 supported in bearings 11 and 12 mounted upon upright frame members 13 and 14 properly connected at the bearing level 11 by cross members 15 and suitable floow level frame members 16. The shaft supports one or more rotating upright disc members 17, which are shown as two in number in FIG. 2, although a machine may have a single disc 17 or more than two discs. The frame of the machine and the bearings for the shaft and the shaft itself with the discs as part thereof are so constructed that the discs will be able to be rotated in an upright plane without substantial deviation from that plane.

The frame supports a water collection pan 20 below the right-hand side of the machine as shown in FIG. 1. A water distribution pipe 21 extends upwardly from the pan spaced a short distance from the disc in order to receive the congealable liquid pumped into the pipe for exit upon the surface of the disc through holes appropriately spaced apart in the pipe to cover a substantial portion of the disc surface with liquid in a sheet. The shape of the pipe ensures that the entire surface of the disc is covered, it being understood that one such pipe is provided for each surface of the disc. Excess water flowing over the surface of the disc and not frozen, drips or flows into the pan 20 from which it is recirculated through the pipe to the disc surface.

The left-hand side of the machine, as shown in FIG. 1, is downwardly open below an array of ice removal tools 25 so that the ice may fall by gravity through the frame of the machine into a storage compartment or room therebelow.

In operation, the liquid to be congealed whether fresh water, sea water, orange juice, or any other congealable liquid, is flowed upon the machine disc surfaces rotating in the direction of the arrow 26 so as to freeze upon the disc in a sheet about one-tenth inch thick. Viewing FIG. 1 as a clock, it may be noted that the water flowing upon the disc surface is cut off just before a given area of the disc reaches the 12 o'clock position. The ice on the surface of the disc is carried in an arcuate path from the 12 o'clock position around to approximately the 7 o'clock position without any contact of any part of the machine with the sheet of ice during this part of the movement. During this movement from 12 to 7 o'clock, the ice may be cooled below 32° toward 0°F, will become dry, hard and will actually shrink so that it cracks and loosens its adherence to the surface of the disc. When the cracked ice sheet meets the removal tools 25, the tools complete the loosening of the ice from its hold upon the surface of the disc. The sheet becomes flakes which fall out of the machine. The surface of the discs are clean of ice from the position of the ice removal tools to the 6 o'clock position where water is again applied to the surface to repeat the process, thus making for continuous ice production.

The construction of the disc is best illustrated in FIGS. 2 to 4. Each disc is approximately 6 feet in diameter and made up of a pair of large round aluminum plates 30 about three-fourths inch thick and spaced apart about three-fourths inch. The periphery of the plates are sealed to a 360°sealing plate 31. The plates are sealed at their inner part to a pipe-like part 32 which has a divider 29 splitting the interior into two parts. A chamber is formed around the pipe 32 by cylindrical plate members 33 and 34 having secured thereto flanges 35 and 36 by the intervening part of the central pipe support 32. A number of drilled holes 37 and 37a in one array connect the interior of the disc to the space 38 in the central hollow shaft. The array of drilled holes 39 and 39a connect the interior of the disc to the other one-half 40 of the hollow shaft for the purpose of ingress and egress of the coolant to the interior of the disc.

The flow passages inside the disc are chosen of substantially constant dimension so that coolant, whether brine, glycol or other coolant, may be pumped through the disc. A flow of about 150 feet per minute has been determined as adequate for good heat transfer. The coolant entering through the hollow shaft space 38 and holes 37 into the interior of the disc will be guided by the baffles 41 and 42 to the extremity of the ,isc on disc side of the divider 43 whereupon the flow path extends to the opposite extremity on either side of the divider 44 and then passes to the inside of baffles 45 and 46 to exit the interior of the disc through the holes 39 into the hollow shaft space 40. The baffles are welded to both plates 30 sufficiently to prevent bulging under the pressure employed to pump the coolant. About 15 pounds per square inch pressure on the coolant is adequate to obtain 150 feet per minute flow rate.

The cooling medium is introduced into the hollow shaft through a stationary split chamber 50 having an inlet pipe 51 for directing the coolant through holes 52 in the hollow shaft part 53 on one side of a partition 54 dividing the interior of the shaft into the two passages 38 and 40. The shaft part 53 is provided with a flange 55 for mating with the flange 33 on the disc 17. It should be understood that the outer surface of each flange is absolutely parallel, within the tolerances capable by machining, with the outer surface of the disc plates 30. The flange 55 on the hollow shaft part 53 is similarly machined so that the mere assemblage of the shaft parts provides a true rotation of the discs. The flat outer surfaces do not vary from the plane in which they rotate more than about 0.005 inch, desirable down to a 0.001 inch variation.

The brine pumped into the hollow shaft part 38 may follow the path described into the interior of the first disc and may return into the space 40 to openings or drilled holes 56 in the hollow shaft part 53 connecting with the outlet 57. It may be noted that the split chamber 50 has seals 58 at its accessible extremities and a partition 59 dividing the inlet from the outlet. The partition is machined with close tolerance to the chromium-plated outer surface of the hollow shaft part 53, and such leakage as might occur between inlet and outlet is inconsequential and small in volume since there is little pressure difference between the inlet and outlet.

As illustrated in FIG. 2, a pair of identical rotating discs may be secured together at the mating flanges 35 and 36 and supported at the end opposite the inlet for the brine by a stub shaft part 60 hving a flange 61 machined accurately to mate with the flange 35 on the second disc 17 to ensure the true running of the discs' surfaces in their respective upright planes.

The drive rotating the disc is quite simple in construction requiring little maintenance. A one H.P. electric motor 65 through a belt drive 66 and sheave 67 driving sprocket of a gear box 68 may in turn rotate the discs and its horizontal shaft through the use of drive chain 69 engaging sprocket output 70 of the gear box and the large drive sprocket 71 mounted upon the shaft part 60. A chain tensioner 72 may maintain the drive shaft taut. The gear box may have a ratio of 150 to 1 and the sheaves and sprockets chosen to provide a rotation of the discs at about one revolution per minute.

Water or other congealable liquid is supplied to each flat upright surface of each disc where ice is to be produced. The flow is regulated by pump pressure and the number and spacing of holes in the pipe 21 to ensure the entire surface of the disc is supplied with an adequate amount of liquid to freeze a sheet of ice on the surface of the disc about one-tenth inch thick. As experienced in drum type machines, some ice may form to a greater thickness, perhaps as much as one-quarter inch thick. Ordinarily, excess liquid merely flows downwardly, dropping into the water pan 20 from which it is recirculated, makeup water being added to the pan as necessary to supplement and replace that which has been frozen into ice. Appropriate controls are provided to maintain sufficient liquid in the water collection trough or pan for being pumped into the pipe 21 for supplying liquid to each disc surface.

The ice removal tools are stationary in position and are mounted upon supporting plates 75 supported at the base part of the frame of the machine and extending upwardly beside each disc in order to support the removal tools. At the top of the plate 75 there is a pair of ½ inch plates 76 and 77, each being at a slightly different angle to the other and to a radius-like line on the disc. It may be noted that neither of plates 76 or 77 lie upon a radius line of the discs but are generally parallel thereto but spaced counterclockwise from a radial line most parallel to either array of ice removing tools. The difference in angles are for the purpose of having the working surface of each ice removal tool oriented at an acute angle of about 3° to 4° to the arcuate path approach of the ice as carried upon the disc into impinging relation with the tool. As in drum type machines, sea water ice making may require a 5° to 6° working angle on the tool surfaces. The ice tools are made in blocks of eight each. The tools comprise a flat L-shaped plate 78 mounted in parallelism and secured by welding to a support plate 79 and plate 80. The working surface of each tool is the flat surface 81 thereof, the balance of the tool being only present for the purpose of supporting the flat surface 81. Surface 82 opposite the flat surface 81 is nonfunctional in removing ice and is present only to form a sharp extremity 83 upon each tool. The outer extremity or edge 83 of the tool is straight, sharp and is to be mounted with close tolerance to the surface of the disc. Ordinarily, at cooled, operating temperatures, the spacing between the edge 83 and the surface of the disc will be about 0.005 inch. The drive end of the shaft is the fixed end and shrinkage of the metal parts upon cooling will be toward the drive end. Tool clearance will be selected accordingly to obtain the clearances specified under operating conditions.

The mounting of the tools is against the support plate 77 or 76. A jackscrew 84 with its locknut 85 may press against an end plate 80 to position the tools relative to the freezing surface of the disc whereupon the locking bolts 86 may be tightened to secure the tools in adjusted position. Several jacking screws 84 may be used for each array of tools as well as several clamping bolts as illustrated in FIG. 2. By orienting each group of eight tools along a different angled line to the disc, the three to four degrees of approach of the ice against the flat surface 81 of each tool will provide for a gradual movement of the ice over the surface of the disc sufficient to make the ice fragment loosen its hold upon the surface of the disc and fall out of the machine as a flake.

In the space between the first ice removal blade and the hub or part of the disc closest to the center thereof, some ice may form which must be removed by a separate plow or scraper-type element. The central portion of the disc may be wrapped in insulation 90 to prevent premature loss of heat absorption ability of the coolant being pumped through the interior of the disc and formation of ice where unwanted. Similarly, some ice may form on the exterior of the disc rim, on plate 31. A scraper may remove any such ice rather than allow same to build up. Such ice may be scraped off to fall into the water trough to aid in pre-cooling the water supply, if desirable.

From time to time, ice removal tools may have to be replaced because the continuous abrasion of the ice upon the metal of the tools does have an eroding effect. It is not contemplated that replacement would be required except after several months of continuous operation. Some congealable liquids are more corrosive or have more eroding effect upon the tools than others. Mineral content of the water used in the water supply may require the tools to be replaced more often. In all such operations the tools need not be replaced except after extended continuous operation. While the tools illustrated are of fabricated construction, cast tools on a common base may be used, if desired.

The present machine provides at least two ice making surfaces for each disc, with each surface having several square feet of useable ice making surface, the disc being shown as preferred having about 28 square feet per side of each disc, a total to 56 square feet per disc. A machine may have one individual disc or more, a two disc machine having double the capacity of a single disc machine. The present machine substantially lowers the cost of a reliable flake ice making machine and has few parts needing attention or maintenance. insulation about the machine may be applied as necessary or desirable. Provision is made for preventing freezing of the water distribution system upon shutdown of the machine. Adequate removable panels or doors will be provided for access to the ice removal tools and other parts requiring periodic maintenance.

I claim:

1. A machine for the continuous production of a congealable liquid in frozen ice flake form, comprising:

a generally horizontal rotatable shaft, a hollow disc mounted upon the shaft and having outer opposite flat freezing surfaces, said shaft rotating the disc and carrying said surfaces in a circular upright plane path, with the flat outer surfaces varying from the plane of rotation less than about 0.005 inches, means for continuously rotating the disc, the disc having interior liquid coolant passages connected with the interior of the shaft for forced flow of coolant through the disc interior for removing heat from said flat freezing surfaces, liquid applying means adjacent a portion of each of the flat surfaces for flowing a sheet of liquid over less than the whole of said surfaces, the remainder of said surfaces carrying ice in a sheet about a tenth inch thick until removed from the rotating surface, a liquid collection trough below said liquid applying means for catching excess liquid flowing over said surfaces, said discs carrying ice frozen upon said surfaces beyond said liquid applying means and through an ice cooling and drying zone, said ice being supercooled in said cooling and drying zone, stationary ice removal tools closely adjacent each of said flat surfaces, in position for the disc to carry ice upon said surfaces into impinging relation with said tools, said tools having surfaces inclined to the arcuate path of ice carried into impinging relation with the tools to gradually force the ice in a direction away from each arcuate path to loosen same for gravity fall from the disc in flake form.

2. A flake ice production machine, comprising:

a disc having an annular flat cooled freezing surface, means rotatingly mounting the disc for rotating the freezing surface in an upright plane continuously, said flat surface being formed to rotate in said plane with variation therefrom of the order of 0.005 inch maximum, liquid applying means for flowing liquid over only a portion less than the whole of the surface for freezing some of the liquid into ice, said liquid being supplied against the surface portion in excess to flow over the surface and off the surface, said ice thereafter being supercooled outside the liquid application area in a sheet about a tenth inch thick,
stationary ice removal tools adjacent said surface
with clearance to such surface substantially less
than ice thickness, the disc rotation carrying the ice in an arcuate path against the tools and each tool having a plane surface oriented across such arcuate path to move the ice gradually radially of such path to remove the ice in flakes.

3. A machine as specified in claim 2 wherein the ice removal tools are in groups secured to a common base with the plane surfaces parallel and spaced apart generally equal distances from each other, each group being oriented to the arcuate path of ice carried on the disc to provide an angle of attack of the ice to said plane surfaces of the order to 3° to 4°.

4. A flake ice continuous production machine, comprising:

a rotatable upright disc having an annular flat cooled freezing surface, said surface being flat within a tolerance of about 0.005 inch from absolute flatness, rotation of the disc moving the surface in a circular path in an upright plane without movement of the flat surface more than within a tolerance of about 0.005 inch out of the plane, all portions of said surface passing sequentially and repetitively through separated zones of liquid application, ice cooling and ice removal, means for continuously rotating the disc, means for continuously flowing liquid onto the freezing surface in the liquid application zone, stationary ice removal tools each having a plane surface oriented across the arcuate path of ice on the surface with an edge of the plane surface within a tolerance of about 0.005 inch of said disc surface so that ice formed on the disc surface in the liquid application zone, having been cooled in the cooling zone, is carried against the tools for removal in flakes.

5. A machine as specified in claim 4 wherein the disc is hollow and has interior refrigerant flow passages of substantially uniform dimension for forced flow of cooling medium to withdraw heat from the disc sufficient to freeze liquid in contact with said flat ice making surface.

6. A machine as specified in claim 4 wherein a plurality of discs are mounted on a common shaft and each disc has a pair of outer exposed ice making surfaces and heat is withdrawn from such surfaces through the interior of each disc.

7. A machine as specified in claim 6 wherein the shaft is driven to rotate the discs in unison.

8. A machine as specified in claim 4 wherein each disc has a hollow hub divided to direct flow of cooling medium into and out of the interior of the disc to carry heat from the ice making surface of the disc.

9. In combination with an ice making machine having a liquid refrigerant congealing component, refrigerant and liquid supply to be frozen and to be broken into flakes, said liquid congealing component comprising:

a generally round disc having a pair of plates with outer flat surfaces parallel to each other, the plates being spaced apart a distance to provide coolant passages between them, said outer surfaces being each parallel to the other within a tolerance of the order of 0.005 inch, means sealing the outer periphery of the plates, means providing separated ingress and egress passages near the center of the plates to the coolant passages for relatively uniform volume and speed of coolant flow through the passages from ingress to egress, and a shaft for mounting the disc for rotation about its center, the shaft rotation moving the flat surfaces in upright parallel planes, said shaft providing for movement of each of said outer surfaces in an upright plane so that each such surface may vary from such plane not substantially more than 0.005 inch during rotation.

* * * * *